May 4, 1943.    G. W. EISENLOHR    2,318,206
APPARATUS FOR TREATING LIQUIDS FLOWING THROUGH HEATED TUBES
Filed June 17, 1940    2 Sheets-Sheet 1
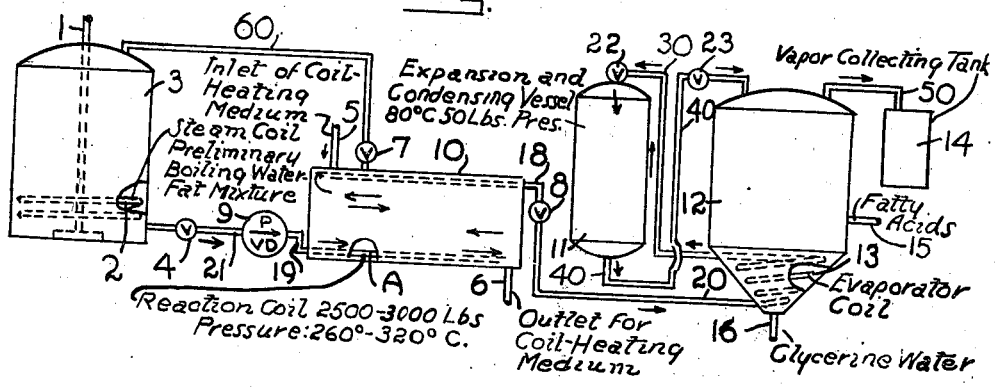
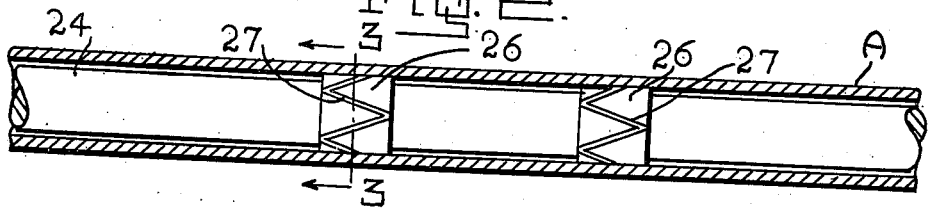
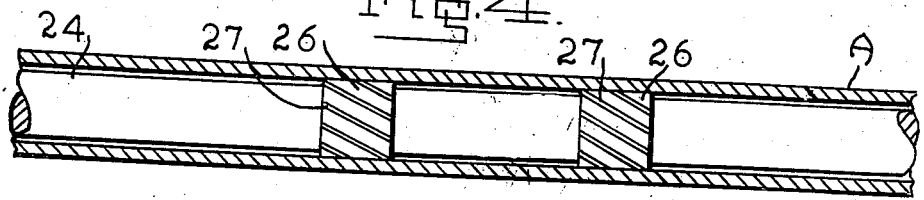
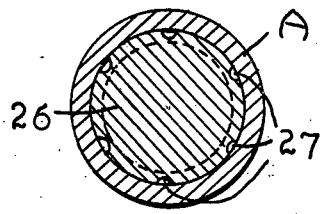
INVENTOR.
Gustav W. Eisenlohr
BY R. F. Miller
ATTORNEYS.

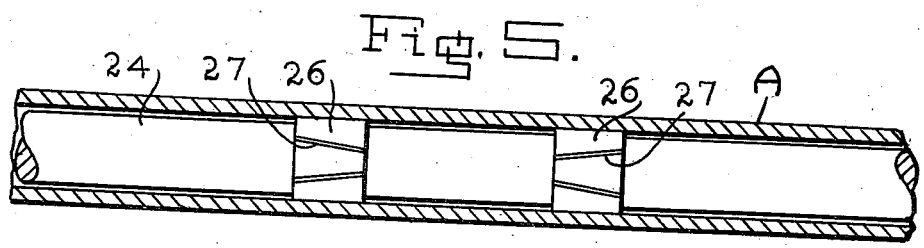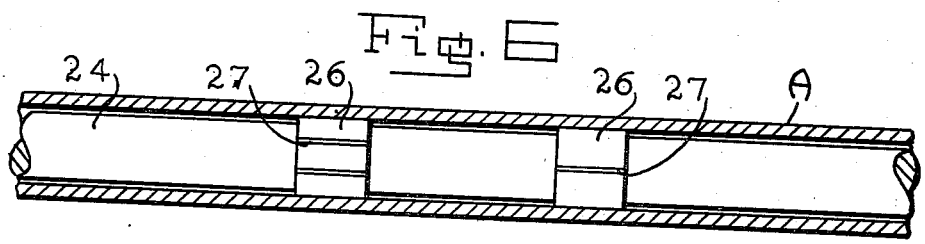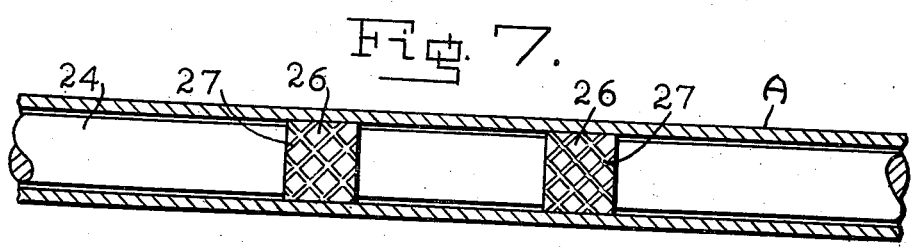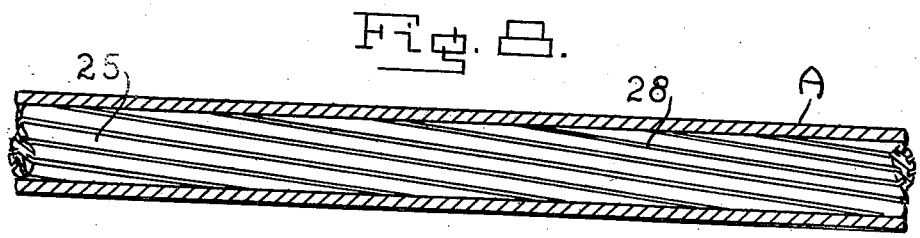

Patented May 4, 1943

2,318,206

UNITED STATES PATENT OFFICE 2,318,206

APPARATUS FOR TREATING LIQUIDS FLOWING THROUGH HEATED TUBES

Gustav W. Eisenlohr, Wyoming, Ohio, assignor to The M. Werk Company, St. Bernard, Ohio, a corporation of Ohio Application June 17, 1940, Serial No. 341,036

8 Claims. (Cl. 138—37)

This invention relates to apparatus and process for obtaining a more efficient heat transfer to liquid material flowing through a heated tube, and more particularly to the heat treatment of aqueous mixtures comprising fatty material in the hydrolyzation of fats.

This invention has as its principal object an improved method and apparatus for the heat treatment of mixtures of fat and water in a heated reaction coil whereby the water and fat mixture is maintained in an emulsified state with an increase in the rate and efficiency of the heat exchange between the mixture and heated reaction coil. Other objects will appear hereinafter.

A valuable application of the present invention is in connection with the hydrolyzation of fats by a method similar to that described in my Patent 2,154,835. In this method, which comprises the continuous and instantaneous hydrolyzation of fat by flowing an emulsified mixture of fat and oil under high pressure through a heated reaction coil, the pressure in the coil has been maintained heretofore by the insertion therein of resistance units which are usually in the form of discs having small perforations.

Foreign matter or impurities, even when present in small amount, builds up against the small holes in the pressure discs and clog them to such an extent as to impede the flow of the mixture and necessitate a shut down in the whole system for cleaning the discs. In addition to avoidance of clogging and uniform heating throughout the reaction coil, essential requirements in obtaining the best results are maintenance of the mixture in emulsified form, and efficient heat transfer between the heated coil and the emulsion. The present invention provides marked improvements in the above described process by overcoming the difficulties previously encountered in preserving the emulsified form of the mixture throughout the length of the reaction coil, by increasing the rate and efficiency of the heat exchange, and by maintaining at all times an uninterrupted flow of the reacting liquid.

Embodiments of my invention are specifically illustrated in the accompanying drawings in which:

Fig. 1 is a side elevation of apparatus illustrating the application of my invention to the manufacture of fatty acids and crude glycerine;

Fig. 2 is a longitudinal sectional view of a portion of the reaction coil within which is shown in more detail a preferred form of my invention;

Fig. 3 is a section on the line 3—3 of Fig. 2; and

Figs. 4 to 8 are modifications of the form of the invention shown in Fig. 2.

The numeral 3 indicates a supply tank within which is placed the fatty material with at least an equal part of water and preferably with about two parts of distilled water for one part of the fatty material. By fatty material is meant any of the hydrolyzable fats or oils known to be suitable for the manufacture of glycerol. The mixture is agitated by a turbine mixer 1 and heated by means of a steam coil 2. The preliminary boiling of the mixture removes the dissolved air preventing darkening of the later formed fatty acids and may also serve as the sole means for agitating the mixture.

The mixture of fat and water passes through the valve 4 in the line 21 and is pumped at a pressure of at least 2500 to 5000 pounds per square inch or more and preferably from 3000 to 3500 pounds, by a pump 9 through the pressure line 19 to the reaction coil A enclosed in the shell 10. The reaction coil is composed of acid resistant metal such as an alloy consisting principally of nickel, chromium and iron and known to the trade as inconel metal, stainless steel or nickel. The numeral 5 indicates the inlet through which the heating medium for heating the reaction coil passes into the shell and envelops the coil therein. The heating medium, which passes from the shell through the outlet 6, may be steam or other suitable heat transfer vapor but is preferably an eutectic mixture of diphenyl and diphenyl oxide since through this material the exact uniform temperature control required in the present process is readily obtained. The material in the reaction coil is heated by this means to a temperature from about 260° to 340° C. and preferably within 300° to 320° C.

Within the reaction coil along spaced lengths thereof, one of which is indicated by the character A, are inserted the means referred to in more detail below, for maintaining both the pressure and the emulsified form of the fat and water mixture, and for insuring efficient heat transfer between the reaction coil and its contents.

The mixture of fatty acid and glycerine solution formed in the reaction coil is forced through the pressure regulating valve 8 in the line 18 into an evaporator coil 13 in the conical bottom of receiving tank 12. The mixture is forced from the coil 13 through the pipe 30 and valve 22 into a conventional water cooled condenser 11 at a temperature and pressure (about 80° C. and 40 to 50 pounds) which causes part of the water to flash into steam. By regulating the temperature of the cooling water in the flash condenser the amount of condensate is controlled, and thus the concentration of the glycerine in the water is controlled. The mixture then passes through the valve 23 in line 40 to the tank 12 where the pressure is fully released. The vapors pass through the pipe 50 to the collecting tank 14, and the condensed glycerine solution and fatty acids, which are further concentrated by the coil 13, collect in the tank 12. The fatty acids are removed at 15 and the glycerine water at 16. A line 60 provided with a safety valve 7 leads from the reaction coil to the supply tank 3 to relieve excess pressure in the reaction coil.

The means inserted within and spaced along the reaction coil A for maintaining the fat and water in emulsified state and for insuring efficient heat interchange comprise solid choke rods of the above mentioned nickel, copper and chromium alloy six or seven feet long, indicated at 24 in Figs. 2 to 7 and at 25 in Fig. 8, spaced at about 200 feet intervals and provided with peripherial channels through which the liquid flows in a plurality of separate thin streams in contact with the coil and which are formed to create a swirl or turbulence of the liquid forced through the channels. In the form shown in Figs. 2 to 7 the rods 24 are provided with pairs of opposing turbulence units 26, these pairs being spaced at about fifteen to eighteen inches along the rod. The members of each pair are spaced a distance substantially less than that between the pairs, namely, from one and one-half to three times the diameter of the reaction coil tube, this distance being usually about one and one-half inches and dependent upon the speed, which may vary from 5 feet to 12 feet per second, the mixture passes through the reaction coil. The turbulence action rapidly diminishes as the distance between the turbulence elements 26 in each pair is decreased to less than the diameter of the pressure coil or is increased to more than eight times that diameter. The best results are obtained in most instances by spacing these elements two to three times the diameter of the coil for the normal working velocities of from 6 to 9 feet per second.

The opposing elements 26 are preferably cylindrical enlargements integral with the rod 24 and machined to a close fit with the inside of the reaction coil. The remainder of the rod is machined to a diameter one-eighth of an inch less than the inside of the tube of the reaction or pressure coil by reason of which the mixture pumped through the coil flows as a one-sixteenth annular film between the rod and inside wall of the pressure tube. The surface of each element 26 is provided with a plurality of passages 27 about one-sixteenth inch in depth through which the liquid flows in contact with the inner wall of the reaction tube from the mentioned annular space at one side of the pair of elements to the annular space between the elements, and from thence to the annular space leading to the next pair of elements.

The annular space between the elements of each pair of elements 26 constitute a turbulence zone or focal space where there is considerable swirl and motion of the liquid in directions other than in the direction of the tube. The motion imparted to the liquid in the thin film in contact with the heated tube maintains the fat and water in emulsified state and brings about maximum efficiency in heat transfer between the tube and liquid. The desired degree of turbulency is obtained in most instances by angularly positioning the grooves 27 with respect to the axis of the tube. However, a useful degree of turbulence under some conditions of operation may be obtained by grooves parallel to the axis of the tube, particularly if the grooves in the two elements of a pair are not aligned as shown in Fig. 6.

The angular positions of the channels tend to create a greater turbulency at the point of convergence and also give a nozzle effect against the opposite or opposing turbulence unit which is so spaced to offer resistance to these streams forcing them back before they can escape through the channels in the opposing unit. By increasing or decreasing the distance, within the limits previously indicated, between the turbulence elements the amount of turbulence created in the mixture pumped through the reaction tube can be increased or decreased as desired.

In Fig. 2 which represents a preferred form, the nozzle action of the channels and the baffle effect of alternate spacing of the channels in the opposing elements 26 creates a very satisfactory turbulence. Excellent turbulence is also obtained by reversing the direction of the swirl by arranging the channels as shown in Fig. 4. A less intense turbulence is obtained by the form shown in Fig. 5 in which the streams converge at a point approximately one-half the distance between the elements. The knurled arrangement of the channels in Fig. 7 results in a high turbulence and is desirable only with low velocities.

In the form of the invention shown in Fig. 8 the spaced turbulence units are replaced by a single unit consisting of the solid rod 25 which closely fits the inside diameter of the tube and which is provided with channels along its length similar to those described above. These channels are cut so as to make one or two revolutions for each six inches of rod. This construction creates a swirl in the emulsion passing through the tube and at the same time is very efficient for heat exchange.

The procedure outlined above when conducted in the absence of air to prevent darkening, and with metal resistant to the fatty acids formed to prevent discoloration, makes possible a highly economical instantaneous hydrolyzation of fats with practically theoretical yield of a more or less concentrated high grade solution of glycerol or sweet water.

The present invention is likewise advantageously used in the mixing and heat treatment of fat and alkali or caustic solutions in continuous instantaneous saponification processes. The apparatus described above is also useful for other purposes, an example of which is its application to the ordinary instantaneous water heater. The formation of hard scale in the tubes is to a great extent prevented or minimized by the turbulence imparted to the flowing liquid as described above, and at the same time the heating of the water as a film would greatly enhance the instantaneous feature of this type of heater.

As many apparently widely different embodiments of this invention may be made without departing from the spirit and scope thereof, it is to be understood that I do not limit myself to the specific embodiments thereof except as defined in the appended claims.

I claim:

1. Apparatus adapted to increase the efficiency of heat transfer to liquid flowing through a heated tube and to provide turbulence zones in the flowing liquid, said apparatus comprising in combination a tube for receiving and transferring heat to liquid flowing therein, a choke rod which is positioned within the tube and which is of slightly less diameter than the inside diameter of the tube to provide an annular space which restricts liquid flow to a thin film between the tube and rod, a pair of spaced cylindrical members on said rod presenting surfaces closely fitting the inner wall of the tube, said members being provided with passages adjacent their periphery through which liquid can flow in separate thin streams from the thin annular space at one side of said pair of members into the thin annular space forming a turbulence zone between the members of said pairs, and from said last mentioned space to the thin annular space at the other side of said members.

2. Apparatus adapted to increase the efficiency of heat transfer to liquid flowing through a heated tube and to provide turbulence zones in the flowing liquid, said apparatus comprising in combination a tube for receiving and transferring heat to liquid flowing therein, a choke rod which is positioned within the tube and which is of slightly less diameter than the inside diameter of the tube to provide an annular space which restricts liquid flow to a thin film between the tube and rod, a plurality of pairs of cylindrical members on said rod, the members of each pair being spaced a distance substantially less than that between successive pairs and the members of each pair being spaced from each other a distance not less than said diameter of the tube and not more than eight times said diameter, said members presenting surfaces closely fitting the inner wall of the tube and having peripherial grooves which communicate with the thin annular space around the rod at each side of and between the members of each pair, and through which liquid can flow from one side to the other of said pairs of members.

3. The combination defined in claim 2 in which the members of each pair are spaced from each other a distance of from one and one-half to three times said diameter of the reaction tube.

4. The combination set forth in claim 1 in which the annular space between the inner wall of the reaction tube and periphery of said choke rod is about one-sixteenth inch in depth.

5. The combination set forth in claim 2 in which the annular space between the inner wall of the reaction tube and periphery of said choke rod is about one-sixteenth inch in depth.

6. The combination set forth in claim 1 in which said passages are angularly positioned with respect to the axis of said reaction tube.

7. The combination set forth in claim 2 in which said passages are angularly positioned with respect to the axis of said reaction tube.

8. Apparatus adapted to increase the efficiency of heat transfer to liquid flowing through a heated tube and to provide turbulence zones in the flowing liquid, said apparatus comprising in combination a tube for receiving and transferring heat to liquid flowing therein, a plurality of choke rods at least six feet long positioned within said tube at spaced intervals along the length of the tube, a substantial portion of the length of said choke rods closely fitting the inner wall of the tube, said portion of each choke rod at its surface having a plurality of shallow grooves which are cut along the entire length of said portion to form from one to two revolutions for each six inches of length and through which liquid can flow in thin streams from one side to the other of said closely fitting portion of the rod to impose a swirling motion to liquid flowing through said apparatus.

GUSTAV WM. EISENLOHR.